May 23, 1961  J. S. HILL  2,984,896
METHOD OF MAKING FILTERS
Filed Oct. 3, 1958
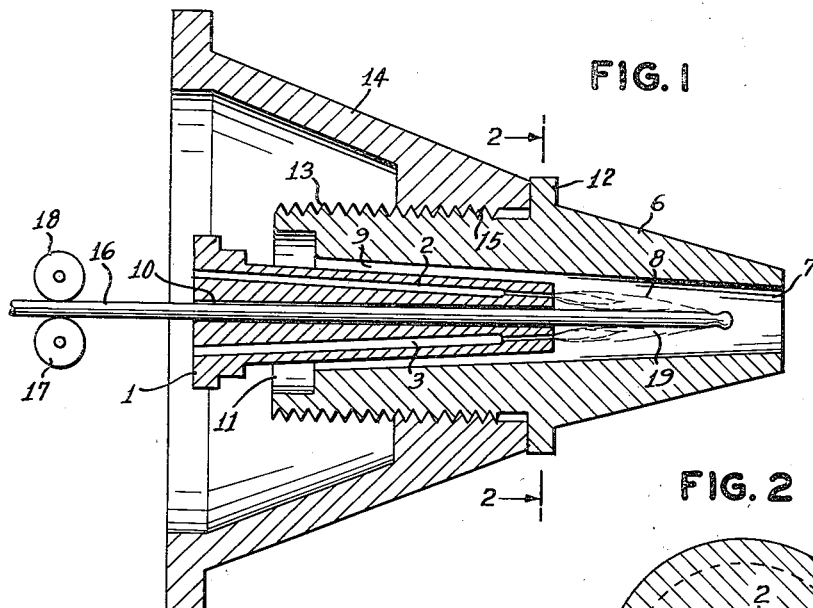
FIG. 1
FIG. 2
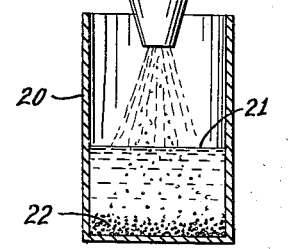
FIG. 3
FIG. 4
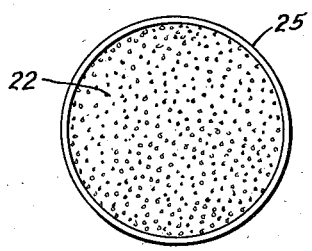
FIG. 5
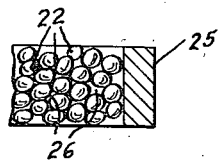
INVENTOR.
JAMES S. HILL
BY
ATTORNEYS

United States Patent Office 2,984,896
Patented May 23, 1961

2,984,896
METHOD OF MAKING FILTERS

James S. Hill, Cranford, N.J., assignor, by mesne assignments, to Engelhard Industries, Inc., Newark, N.J., a corporation of Delaware Filed Oct. 3, 1958, Ser. No. 765,101

4 Claims. (Cl. 29—420)

The present invention deals with a method of making filters and more particularly with a method of making a filter of metal and having a substantially uniform pore size throughout its mass.

Filters of the type herein contemplated are employed for the filtration of fluids, both gaseous and liquid, and are formed, for example, by passing molten metal from an elevated container into a cooling liquid in the well-known manner of making lead shot, whereafter the metal spheres are assorted for size, packed into a frame and fritted to form a filter.

In the manufacture of such filters especially from metals which are resistant to high temperatures and corrosive fluids, the molten metal is passed through a spinnerette type member and the thin streams of metal are subjected to an air blast or gas blast directed against the thin streams to form discrete pellets. A substantially large portion of these pellets are non-spherical due partly to the manner of applying the gas blast. The pellets are predominately of a tear drop or nodule shape, which, when assorted, packed and fritted, do not provide a filter having a substantially uniform pore size throughout its mass.

It is an object of the present invention to provide a filter made of metal spheres and which has a substantially uniform pore size throughout its mass. It is another object of the invention to provide a method of making metal pellets for filters, which pellets are predominately spherical and provide for a substantially uniform pore size throughout the filter mass. Other objects and advantages of the invention will become apparent from the description hereinafter following and the drawings forming a part hereof, in which:

Figure 1 illustrates a cross-sectional view of an apparatus for forming metal spheres according to the invention, Figure 2 illustrates a cross-sectional view along lines 2—2 of Figure 1, Figure 3 illustrates a partly diagrammatic and partly cross-sectional view of a component of the apparatus for forming metal spheres according to the invention, Figure 4 illustrates a top view of a filter member made by the method of the invention, and Figure 5 illustrates a fragmentary cross-sectional view of Figure 4.

The invention deals with a method of producing metal spheres by introducing a metal rod into a high temperature gas flame, confining the flame and its attendant high temperature along an end portion of the rod, melting an end of the rod by means of the flame, and simultaneously passing a high velocity gas other than the flame gas over the molten end of the metal rod, whereby the other gas, e.g. high pressure air, blasts and entrains the molten metal from the end of the rod, and expels the molten metal outwardly of the confined melting zone in the form of spheres. After passing the melting zone the high velocity gas diverges and directs the entrained metal spheres into a cooling liquid.

Referring to Figures 1 and 2, the apparatus for making metal spheres according to the method of the invention comprises an elongated inner gas nozzle 1 having at least one and preferably a plurality of longitudinal gas conduits 2, 3, 4 and 5 formed therethrough. Alternatively, the conduits 2, 3, 4 and 5 may comprise functionally equivalent tubes. An outer longitudinal gas nozzle 6 envelopes the outlets of the inner nozzles with the outlet 7 extending forwardly of the inner nozzle outlets and forming a combustion chamber 8 between the outlets of the inner and outer nozzles. The inner and outer nozzles are spaced from each other forming a peripheral gas passage 9 about the inner nozzle 1. The outlet openings of the inner nozzle are spaced from each other normal to the axis of conduit 9 with the said axis being between a pair of the openings, and the openings being directly to converge toward the axis of the outer nozzle 6. An elongated passage 10 is provided substantially coaxially of the outer nozzle 6 between the gas conduits 2, 3, 4 and 5 with the gas conduit 9 being substantially concentric with the passage 10. The bore of the outer conduit 6 is tapered from its inlet 11 to its outlet 7. The outer nozzle 6 is provided with an external flange 12 between the inlet 11 and the outlet 7, and the surface of the nozzle 6 is threaded as at 13 between the inlet 11 and flange 12. A substantially cone-shaped hollow member 14 is provided with internal threads near its apex, as at 15, and is thereby engaged with the threads 13 of conduit or nozzle 6. A metal rod 16, for example a platinum rod, is positioned through the coaxial passage 10 and fed therethrough by feeding means, e.g. drive rolls 17 and 18.

In operation, and according to the method of the invention, a source of combustible gas, e.g. oxy-acetylene or oxy-hydrogen, is connected to the nozzle 1, whereby the gas under substantial pressure and velocity passes through the gas conduits 2, 3, 4 and 5, is ignited in the combustion chamber 8 and forms a high temperature flame 19 directly onto an end portion of the platinum rod in the combustion chamber 8. The flame 19 has a temperature higher than the melting temperature of the rod 16.

Simultaneously with the passing of combustible gas through the inner nozzle, another gas, e.g. air, under high pressure, e.g. from about 20 to 70 pounds pressure, is introduced into the gas cone 14 wherefrom it passes through the conduit 9 enveloping and confining and accelerating the gas flame about the surface of the rod 16 within the combustion chamber forming a flame sleeve over the end portion of the platinum rod. The combustible gas, in view of the high melting point of the metals herein contemplated, is ordinarily not of sufficient velocity to adequately blast metal from the end of the rod 16. However, supplemented by the high pressure air sleeve, small globules of molten metal are blasted from the molten end of the rod and diverged outwardly of the nozzle outlet 7 while entrained in said high velocity gas. As soon as the entrained globules of molten metal are diverged outwardly of the nozzle 7, the globules assume a shape of spherical shot. As illustrated by Figure 3, the gas entrained spheres are directed into a tower or container 20 partly filled with a cooling liquid 21, wherein the cooled spheres 22 are collected. The combustion gas is fed to the inner nozzle 1 by means of gas conduits 23 and 24. Having collected a sufficient quantity of spheres at the bottom of the container 20, the sphere forming operation hereinabove described is discontinued and the cooled spheres are collected and assorted by sieving through several mesh sizes to collect spheres of desired diameter.

By the sphere making method above described, approximately 90% of the shot is in the form of spheres of which about 80% are useable for the manufacture of filters. After obtaining a lot of spheres having substantially uniform dimensions, the spheres are packed into a frame 25 and placed into a suitable furnace where the spheres are fritted to form a coherent mass in the form of a filter having substantially uniform pore size throughout the mass thereof as illustrated by Figure 5.

After fritting, the pores throughout the mass of the filter were found to have substantially uniform cross-sectional diameters ranging from about 20 percent to about 30 percent of the diameters of the spheres 22, or about plus or minus 10 percent uniformity. For example, spheres 22 were collected from the container 20 and sieved through a pair of sieves one of which had apertures of 82 microns diameter and the other apertures of 74 microns diameter. The spheres collected on the smaller sieve ranged from about 82 microns to 74 microns diameter. Since the method of the invention assures the provision of spherical pellets, it is apparent that the fritting of such spheres produces more uniformity of pores than other methods when the pellets range from spheroidal to tear-drop shapes. Furthermore, with the high velocity gas passing in the form of a sleeve over the molten end of the metal rod the size of the sphere desired can be varied or controlled by variation in the blast gas velocity.

While the invention has been described with reference to the specific illustrations, various modifications are contemplated within the scope of the appended claims.

What is claimed is:

1. The method of making a filter composed of a frame containing spherical shot comprising feeding a metal rod through a tubular combustion chamber, passing a gas flame into the chamber and over an end portion of the rod, passing a high velocity gas over the gas flame and confining the gas flame over the end portion of the rod, expelling molten metal in the form of globules from the end of the rod by means of the high velocity gas, forming spherical shot by passing the globules through space into a cooling liquid, collecting and assorting the resultant shot into a lot of spherical shot having substantially uniform dimensions, packing the lot into a frame throughout its inner cross-sectional area and fritting the shot in said frame under frititng temperatures.

2. The method according to claim 1, wherein the metal rod is a platinum rod.

3. The method according to claim 1, wherein the high velocity gas is air.

4. The method according to claim 1, comprising entraining the expelled metal in said high velocity gas and thereby directing the expelled metal into the cooling liquid.

References Cited in the file of this patent
UNITED STATES PATENTS

| | | |
|---|---|---|
| 1,128,175 | Morf | Feb. 9, 1915 |
| 1,874,035 | Fletcher | Aug. 30, 1932 |
| 2,151,083 | Christiansen | Mar. 21, 1939 |
| 2,189,387 | Wissler | Feb. 6, 1940 |
| 2,636,219 | Beamer | Apr. 28, 1953 |